United States Patent [19]
Carpenter et al.

[11] Patent Number: 4,877,778
[45] Date of Patent: Oct. 31, 1989

[54] METHOD OF ENHANCING LIPOPHILE TRANSPORT USING CYCLODEXTRIN DERIVATIVES

[75] Inventors: Thomas O. Carpenter, Orange, Conn.; Josef Pitha, Baltimore, Md.

[73] Assignee: The Children's Medical Center Corporation, Boston, Mass.

[21] Appl. No.: 68,921

[22] Filed: Jul. 1, 1987

[51] Int. Cl.$^4$ ..................... A61K 31/715; C08B 37/16
[52] U.S. Cl. ..................................... 514/58; 514/824; 536/103
[58] Field of Search .................... 536/103; 514/58, 824

[56] References Cited

U.S. PATENT DOCUMENTS

| 3,453,259 | 7/1969 | Parmerter | 536/103 |
| 3,459,731 | 8/1969 | Gramera | 536/103 |
| 4,407,795 | 10/1983 | Nicolau | 514/824 |

FOREIGN PATENT DOCUMENTS

| 70368 | 1/1983 | European Pat. Off. | 514/824 |
| 57-31661 | 2/1982 | Japan | 514/824 |
| 58-210077 | 12/1983 | Japan | 514/824 |

OTHER PUBLICATIONS

Pitha and Szente, *Life Sciences*, 32:719–723, (1983).
Pitha et al., *J. Pharma. Sciences* 75:165–167, (1986).
Pitha et al., *Int'l. J. of Pharmaceutics* 29:73–82, (1986).
Pitha and Szente, *Int'l. Symp. on Cyclodextrins*, Budapest, (1981).
Pitha, J. *Inclusion Phenomena*, 2:477–485, (1984).
Pitha and Pitha, *J. Pharmaceutical Sciences*, 74:987, (1985).
Pitha, Third Int'l. Symposium on Recent Advances in Drug Delivery Systems, Salt Lake City, Utah, Feb. 23–27, (1987).

*Primary Examiner*—Ronald W. Griffin

[57] ABSTRACT

Levels of cholesterol, vitamin A, triglycerides, and other lipophiles in the human circulation can be manipulated by intravenous infusion of cyclodextrin-type compounds. The cyclodextrin-type compound should be highly soluble in water, amorphous and of only moderate molecular weight in order to be easily excreted; one preferred cyclodextrin, 2-hydroxypropyl-$\beta$-cyclodextrin with an average molecular weight of 1460, is administered at doses of 0.5 g/kg x day. The serum levels of the lipophiles indicate that the infusion may serve to mobilize the lipophile from tissues, induce its excretion, and furthermore affect its homeostasis.

9 Claims, 1 Drawing Sheet

METHOD OF ENHANCING LIPOPHILE TRANSPORT USING CYCLODEXTRIN DERIVATIVES

BACKGROUND OF THE INVENTION

This invention was funded at least in part by a grant and other support from The Department of Health and Human Services, and the Government has certain rights in this invention.

This invention relates to treating humans and animals to control serum transport of lipid-soluble compounds (particularly cholesterol, vitamin A and triglycerides) for example to treat deficiencies in transport, excretion and metabolism of lipid-soluble compounds or to redistribute lipid-soluble compounds among various tissues.

Lipophiles (i.e., compounds soluble in lipids, but not in water), including those which are normal constituents of the human body, become pathogenic agents when the organism lacks the ability to transport, excrete, metabolize, or redistribute them properly. Such functions, particularly those related to transport phenomena, may involve carrier proteins and cellular receptors.

In the case of cholesterol, naturally produced carrier proteins carry the lipophile and circulate in vascular and lymphatic systems until the lipophile is absorbed by cells. The carried lipophile is then used in cell metabolism. Absorption of carrier proteins by a cell is a regulated and specific process mediated by receptors which are located on the surface of cells which tightly bind the protein and serve in its internalization.

In the absence of appropriate carrier proteins or their receptors a disease state is established. Cholesterol, a vital substance, when deposited into an arteriosclerotic plaque is converted into a causative agent of a family of often fatal vascular diseases. While cholesterol deposits in the vascular system are being formed, other tissues maintain continued cholesterol synthesis and thus further aggrevate the disease.

Other examples of human disease (including the toxicity of fat-soluble vitamins) relate to excess circulating levels or excess tissue loading of lipophiles. Vitamin D has been used in large dosages to treat various forms of metabolic disorders, including hypoparathyroidism and vitamin D resistance syndromes. As there is a narrow margin between the therapeutic and toxic dosages of vitamin D in many of these disorders, toxicity from vitamin D has frequently occurred. Another condition which may be related to an increased sensitivity to vitamin D or abnormal accumulation of its metabolites is the Williams syndrome, or idiopathic hypercalcemia of infancy.

Another serious disorder is hypervitaminosis A. Several serious problems are involved in the use of a synthetic carriers to control lipophile transport in serum. To be useful as a therapeutic, a transfer agent must have a demonstratable, quantitative effect at relatively low concentration levels. Specifically, the carrier must be able to transport the lipophile, when present in regulated, adaptable concentrations, far below the concentrations suggested by stoichiometric matching with normal serum lipophile levels. For example, serum concentrations of cholesterol in humans may vary from about 100-400 mg/dl, whereas triacylglycerol concentrations may vary from 60-1200 mg/dl. Thus, the range of variation for these two lipophiles alone is about 1400 mg/dl. In vitro solubilization of cholesterol using a carrier such as a cyclodextrin requires about ten times their excess weight of cyclodextrins. If that ratio were to apply in vivo, about one pound of solubilizer would have to be infused into a man just to make up for the normal range variation; a situation clearly impossible. Moreover, the situation is further complicated by the presence of lipophiles in various tissues at concentrations well in excess of the serum levels. This tissue could act as a reservoir, supplying lipophile to the blood stream and thus overwhelming any synthetic carrier.

SUMMARY OF THE INVENTION

We have discovered that certain cyclodextrin derivatives are particularly suited to control transport im mammalian circulation of lipophiles that naturally occur at concentrations far in excess (at least about $10^3$ on a stoichemetric basis) of the cyclodextrin. In effect, the cyclodextrin exhibits a catalytic-transport effect. Accordingly, the invention features catalytically enhancing circulatory transport of naturally occurring lipophiles present in prolonged excessive concentrations (e.g., levels chronically far above desired physiological levels) by intravenous infusion of cyclodextrin compounds having the following formula:

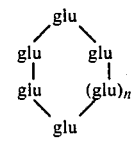

where $n=1-3$, and glu represent a glucose or substituted glucose residue connected in the manner of an amylose chain, each said glucose residue being independently selected from glucose and alkyl or hydroxyalkyl (most preferably methyl, ethyl or hydroxypropyl) substituted glucose derivatives, said cyclodextrin being amorphous and soluble.

In preferred embodiments, the cyclodextrin compound is a derivative of $\beta$-cyclodextrin, e.g., a 2-hydroxypropyl-$\beta$-cyclodextrin, and the lipophilic transport being controlled is serum transport of cholesterol, vitamin A, or triglycerides.

The above synthetic carriers are particularly useful carriers, being relatively non-toxic, having suitable characteristics to carry lipophiles and thereby ameliorate excess concentrations of maldistribution of lipophiles. In particular, the invention provides a relatively benign way to clear the system of excess lipophiles, e.g., in serum. Serum cholesterol levels chronically above about 200 mg/dl, and even significantly higher, can be treated, as can vitamin A levels even up to about 2,700 mg/dl, or triglyceride levels chronically above about 200 mg/dl.

Other features and advantages of the invention will be apparent from the following description of a preferred embodiment thereof, and from the claims.

DESCRIPTION OF THE PREFERRED EMBODIMENT

Cyclodextrins ($\alpha$, $\beta$, and $\gamma$) used in this invention are products of the enzymatic degradation of the starch in which, respectively, six, seven, or eight glucose residues of an amylose chain are connected into a circle. The interior part of the circle is of low polarity and lipophiles of suitable size may be included. This type of complexing is readily reversible and thus, cyclodextrins may function as carriers. The cyclodextrin can be selected to match the size of the lipophiles of interest. In general, for cholesterol, vitamin A and similarly sized lipophiles, the $\beta$ or $\gamma$ homolog are preferred. The solubility of $\beta$-cyclodextrin in water is very low (2%) and produces nephrotoxicity upon intravenous administration, probably due to crystallization during tubular uptake. Nevertheless, $\beta$-cyclodextrin can be derivatized to improve solubility and decrease toxicity, examples being hepkakis(2,6-di-O-methyl)-$\beta$-cyclodextrin or mixtures of 2-hydroxypropyl-$\beta$-cyclodextrins, 2,3-dihydroxypropyl-$\beta$-cyclodextrins, or poly-$\beta$-cyclodextrins. Derivatizations of cyclodextrin must not render the compound lipophilic since water solubility would then be lowered and toxic effects would be enhanced. The molecular weight must not be greater than excretion limits of the kidney, estimated for humans to be about 60,000 daltons. Branched cyclodextrins similar to the above synthetic derivatives cyclodextrin may also be of use.

It is particularly advantageous to use amorphous, water soluble cyclodextrins. Amorphous character is achieved by substituting cyclodextrin in a manner described below that creates sufficient mixture of substituted cyclodextrins to avoid crystalinity. Water solubility is achieved by substitutions with hydrophilic residues.

Specific examples of the above-described method are provided below to illustrate the invention, without limiting its scope. Specifically, 2-hydroxypropyl-$\beta$-cyclodextrin is infused into a patient with severe chronic hypervitaminosis A.

Preparing 2-hydroxypropyl-$\beta$-cyclodextrin

Preparation of the cyclodextrin derivative is carefully accomplished to avoid contaminants such as $\beta$-cyclodextrin which is slightly nephrotoxic.

Figure 1:
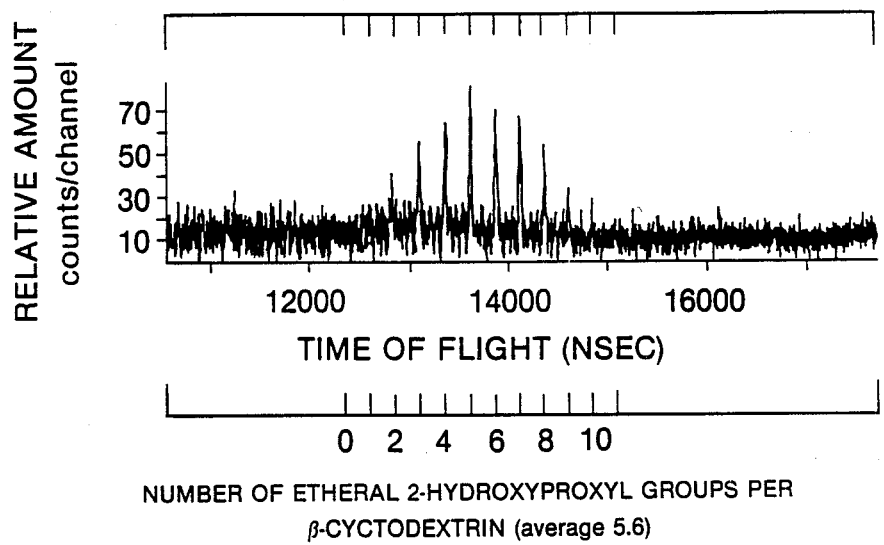
FIG. 1 shows the mass spectrum of 2-hydroxypropyl, $\beta$-cyclodextrin measured using a Cf-252 plasma desorption spectrometer.

$\beta$-Cyclodextrin (food grade, Chinoin, Hungary) 346 g of hydrate, corresponding to 300 g of anhydrous material, 0.26 mol) was dissolved in a solution of sodium hydroxide (106 g, 2.64 mol) in water (750 mL) while heating to 60° C. After cooling the solution to room temperature, a condenser, which was cooled by a dry ice-acetone mixture, was attached to the flask and propylene oxide, (freshly redistilled, boiling point 34° C., 185 mL, 2.64 mol), was added dropwise to the mixture while stirring. After another hour at room temperature the mixture was heated to 60° C. for one hour, cooled, neutralized with 10N HCl, and clarified by centrifugation. The solution was then dialyzed against water until no chloride ions could be detected by silver nitrate in dialysate. This process required about 36 hours with twelve changes of distilled water. The hours with twelve changes of distilled water. The retained solution was again clarified by centrifugation and subsequently freeze-dried, yielding 221 g of 2-hydroxypropyl-$\beta$-cyclodextrin. Upon examination by thin layer chromatography (silica gel layer, developed by butanone-methanol-water, 70:15:15, and visualized by a spray of 50% sulfuric acid and charring) only one spot was visible ($R_f$ 0.38). In this system the parent $\beta$-cyclodextrin and its polymers can be readily distinguished by their lower $R_f$ values. Nuclear magnetic resonance spectrum of the product was measured in deuterium oxide with sodium 2,2-dimethyl-2-silapentane-sulphonate as standard on a JEOL PMX-60SI spectrometer. Comparison of integrated values of the signals at 5.1 ppm (anomeric proton) and 1 ppm (methyl group) indicated a degree of substitution of 5.6. Mass spectrum of the product was measured using a Cf-252 plasma desorption spectrometer and is presented in FIG. 1. The degree of substitution calculated from the mass spectrograph coincides, within the expected error, with that measured by nuclear magnetic resonance, proving that complete volatilization of the sample occurred in mass spectrometer and that there is no detectable fraction of molecular weight higher than those indicated by the mass-spectrogram in FIG. 1. No $\beta$-cyclodextrin was detected.

Administration of Cyclodextrin Derivative

Serum cholesterol, retinol and retinyl ester levels were measured during the course of 2-hydroxypropyl-$\beta$-cyclodextrin infusion (470 mg/kg/24 hours or total of 30 g over a 4 day period in the form of 5% aqueous solution in water) in a patient with severe, chronic hypervitaminosis A. Serum retinol remained in the normal to low-normal range throughout the period of monitoring. Within 24 hours of the onset of 2-hydroxypropyl-$\beta$-cyclodextrin serum levels of retinyl esters markedly increased to approximately 4,800 µg/dl. A steady decrease in the concentration of serum retinyl esters followed.

Figure 2:
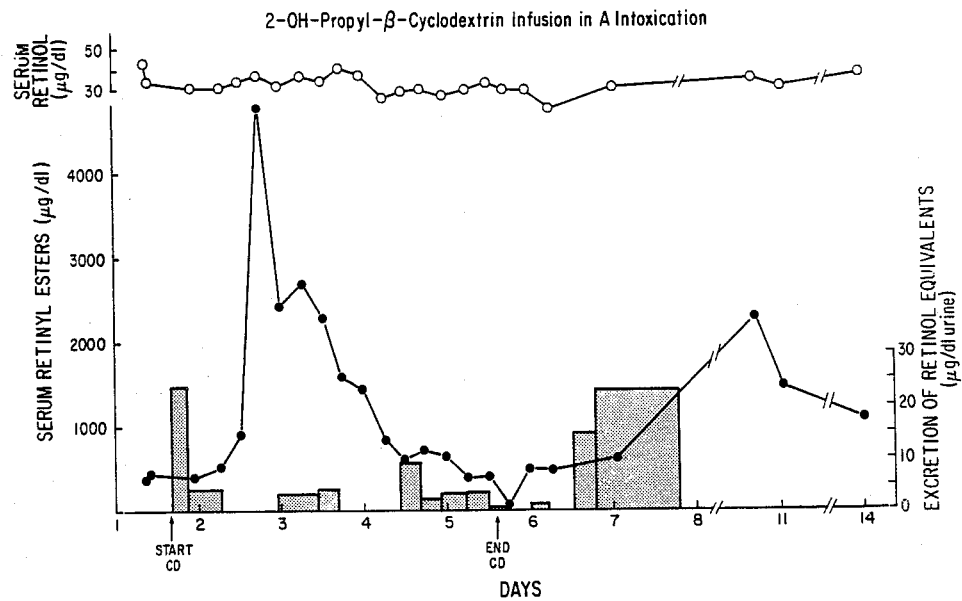
FIG. 2 shows urinary excretion of Total vitamin A metabolites during cyclodextrin infusion.

Urinary excretion of total vitamin A metabolites during cyclodextrin infusion was also monitored as shown in the lower panel of FIG. 2. Two 24-hour urine collections before infusion of cyclodextrin showed no detectable vitamin A present. An increase in urinary vitamin A excretion occurred during the first 6-hour collection after initiation of the infusion of 2-hydroxypropyl-$\beta$-cyclodextrin. During this time 23.2 µg/dl of total vitamin A was present in the urine. This effect was observed before any appreciable rise in serum retinol or retinyl ester concentrations and provides evidence that the enhanced urinary excretion is not merely a function of circulating levels.

The data indicate that complexes are formed with circulating lipophilic compounds. Urinary excretion is maintained (at concentrations ranging from 2.2 to 9.0 µg/dl) throughout the remainder of the infusion. After cessation, excretion remained elevated to 22.9 µg/dl) for several days following the infusion. Increase in serum levels may reflect mobilization of hepatic vitamin A stores.

On the 4th day of the infusion the patient developed generalized irritability and pain in the legs and shins much like the recurrent symptoms representative of vitamin A toxicity, indicating that treatment of vitamin A toxicity with cyclodextrin should be monitored and, if necessary, accompanied by, or staggered with, administration of plasma. The infusion was therefore discontinued and 250 mL of fresh frozen plasma was administered over 3 hours. The acute symptomatology resolved within the next 12 hours. Serum pH and concentrations of glucose, protein, albumin, calcium, phosphate, and hepatic transaminases remained normal throughout the infusion (Table 1). There was a 20–30% decrease in cholesterol levels during the infusion.

While not necessarily directly related to the infusion of cyclodextrins, the patient'long-term status improved after infusion was discontinued, in that the patient remained well with only two episodes of recurrent hypervitaminosis in the following year; one occurred four months following the infusion and the second in association with 1,25(OH)$_2$vitamin D$_3$ administration for management of concurrent hypoparathyroidism.

Evaluation of Results

This attempt to affect the transport of lipophiles in the human body was clearly successful. Two distinct mechanisms may contribute to the action of this agent.

With regard to the retinyl esters and retinol, a new carrier entering into the circulation is complexed with the lipophile and the serum concentration of the lipophile was initially increased. Redistribution of lipophile from the cyclodextrin complex to serum proteins then occurred. Thereafter, the distribution of the lipophile to organs capable of its metabolism or storage decreases the serum concentration.

Regarding serum cholesterol, the mechanism must be different, involving mechanism a homeostatic response of the organism to the new carrier. A new carrier loaded with cholesterol may signal appropriate target tissues and cause the organism to perceive an overabundance of the cholesterol (due to over-production or excessive release into the circulation) and serum cholesterol is consequently down-regulated. Such down-regulation is a known biologic phenomenon. Fasting or feeding with high cholesterol increases or decreases, respectively, the plasma concentration of mevalonic acid, which is a between-product of cholesterol biosynthesis. Such a mechanism explains the response of circulating cholesterol to this agent, where only a decrease in the serum concentration could be observed.

The balance of substances present in the body also attests to such a mechanism. At 20 kg body weight, the subject may have about 600 mL of plasma. If one day's total dose of hydroxypropyl-$\beta$-cyclodextrin (about 10 g, 6.8 mmol) was dissolved in that plasma, the solution was, at a maximum, about 1.6% or 10 mM. Experience with the treatment of erythrocyte membrane preparations indicates that cholesterol, protein, and phospholipid are released in about the same amount. Extensive experience with complexes of cyclodextrins indicates not more than 10% by weight of the lipophile can be solubilized per cyclodextrin used. Thus, the pool of circulating cholesterol in the subject could have been increased maximally by 50 mg/dl; probably by an order of magnitude less. Since the subject's normal cholesterol is about 200 mg/dl, the natural cholesterol carrying system predominates and it is the new homeostasis which must be responsible for the observed drop in serum cholesterol. Possibly, cyclodextrin-complexed cholesterol equilibrates rapidly with surfaces of all tissues and without any specific receptors, resulting in the immediate response.

Other Embodiments

Other embodiments are within the following claims. For example, the cyclodextrin may be administered in any number of pharmaceutically acceptable vehicles. Concentrations may be adjusted depending on the specific pathology presented by the patient. Other routes of administration may be used.

Other, analogous methods of synthesizing modified cyclodextrins are known. See, e.g., Gramera et al., U.S. Pat. No. 3,459,731; Parameter et al., U.S. Pat. No. 3,453,259; Pitha, *J. Incl. Phenomena* 2: 477–485 (1984); Pitha and Pitha, *J. Pharm. Sci.* 74: 987–990 (1985); Pitha et al., *J. Pharm. Sci.* 75: 165–167 (1986); and Pitha et al., *Int. J. Pharm.* 29: 73–82 (1986).

Other human disease states can be treated.

TABLE I

| Day | Infusion of CD | | | | | | Day After CD | | |
|---|---|---|---|---|---|---|---|---|---|
| | −1 | 1 | 2 | 3 | 4 | End | 1 | 2 | 3 |
| white blood count | 6900 | | | 8400 | | | | 770 | |
| hemoglobin | 11.5 | | | 10.5 | | | | 10.2 | |
| sodium (M EQ/L) | 133 | | | | | | | 138 | |
| potassium (M EQ/L) | 3.6 | | | 4.6 | | | | 3.8 | |
| chloride (M EQ/L) | 107 | | | 107 | | | | 107 | |
| bicarbonate (M EQ/L) | | | | 21 | 13 | | | 16 | |
| urea (MMOL/L) | 2.4 | 1.7 | | 3.2 | | | | 3.2 | |
| creatinine ($\mu$MOL/L) | 35 | | | 44 | | | | 35 | |
| protein (G/L) | 56 | 63 | 57 | 63 | 64 | | 66 | 65 | |
| albumin (G/L) | 40 | 41 | 38 | 40 | 40 | | 42 | 41 | |
| glucose (MG/DL) | 72 | 104 | 94 | | 103 | | | 113 | |
| total calcium (MMOL/L) | 2.00 | 2.07 | 1.98 | 2.07 | 1.90 | | 2.10 | 2.05 | |
| ionized calcium (MMOL/L) | 1.06 | 1.14 | 1.04 | 1.13 | 1.05 | | 1.07 | 1.08 | 1.09 |
| pH | 7.48 | 7.38 | 7.46 | 7.42 | 7.41 | | 7.45 | 7.46 | 7.40 |
| phosphate (MMOL/L) | 1.55 | 1.67 | 1.71 | 1.77 | 1.64 | | 1.80 | 1.77 | |
| cholesterol | 199 | 214 | 187 | 178 | 179 | | 209 | 211 | |
| uric acid (MMOL/L) | 0.23 | 0.25 | 0.22 | 0.18 | 0.15 | | 0.27 | 0.17 | |
| alkaline phos (IU/L)(<300) | 950 | >700 | 647 | >600 | 611 | | 559 | 650 | |
| T. bilirubin ($\mu$MOL/L) | 29 | 32 | 27 | 29 | 30 | | 34 | 29 | |
| conjugated bilirubin | 2 | 1 | 2 | 2 | 2 | | 2 | 3 | |
| ALT U/L (<35) | 32 | 43 | 65 | 35 | 36 | | 33 | 47 | |
| AST U/L (<40) | 67 | 74 | 62 | 70 | 35 | | 55 | 82 | |
| $\gamma$GT U/L (<50) | 52 | 59 | 15 | 54 | 56 | | 53 | 55 | |
| LDM U/L (<200) | | | | 536 | | | | | |

We claim:
1. A method of treating a mammal to catalytically enhance serum transport of a naturally occurring lipophile present in prolonged excessive concentrations, comprising administering to said mammal a cyclodextrin derivative having the following formula:

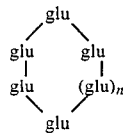

where n=1-3, and glu represents a glucose or substituted glucose residue connected in the maner of an amylose chain, each said glucose residue being independently selected from glucose and alkyl or hydroxyalkyl substituted glucose derivatives, said cyclodextrin being water soluble.

2. The method of claim 1 wherein said method enhances serum transport of cholesterol.

3. The method of claim 1 wherein said method enhances serum transport of vitamin A.

4. The method of claim 1 wherein said method enhances serum transport of triglycerides.

5. The method of any of claims 1-4 wherein said cyclodextrin derivative is administered to a human.

6. The method of any of claims 1-4 wherein said cyclodextrin derivative comprises 2-hydroxypropyl-$\beta$-cyclodextrins.

7. The method of any of claims 1-4 wherein said cyclodextrin derivative is administered intravenously.

8. The method of claim 7 wherein said cyclodextrin derivative is administered by intravenous infusion.

9. The method of any of claims 1-4 wherein said cyclodextrin derivative is amorphous.

* * * * *